(12) United States Patent
Strihagen

(10) Patent No.: US 11,983,545 B2
(45) Date of Patent: May 14, 2024

(54) DYNAMIC PROCEDURES FOR SOFTWARE PRODUCTS

(71) Applicant: Addi Medical AB, Danderyd (SE)

(72) Inventor: Björn Strihagen, Täby (SE)

(73) Assignee: Addi Medical AB, Danderyd (SE)

( * ) Notice: Subject to any disclaimer, the term of this patent is extended or adjusted under 35 U.S.C. 154(b) by 105 days.

(21) Appl. No.: 17/524,774

(22) Filed: Nov. 12, 2021

(65) Prior Publication Data

US 2022/0147374 A1    May 12, 2022

(30) Foreign Application Priority Data

Nov. 12, 2020   (SE) .................................. 2051321-4

(51) Int. Cl.
*G06F 9/445* (2018.01)
*G06F 8/41* (2018.01)
*G06F 8/54* (2018.01)

(52) U.S. Cl.
CPC ............ *G06F 9/44521* (2013.01); *G06F 8/44* (2013.01); *G06F 8/54* (2013.01)

(58) Field of Classification Search
None
See application file for complete search history.

(56) References Cited

U.S. PATENT DOCUMENTS

| 6,442,752 | B1 * | 8/2002 | Jennings ............ G06F 9/44521 |
| | | | 719/331 |
| 10,146,515 | B1 | 12/2018 | Sundresh |
| 10,146,522 | B1 | 12/2018 | Sundresh |
| 2003/0110151 | A1 | 6/2003 | Fortier |
| 2007/0245331 | A1 | 10/2007 | Daynes et al. |
| 2008/0059949 | A1 | 3/2008 | Matic |
| 2009/0249368 | A1 | 10/2009 | Needamangala et al. |
| 2010/0146481 | A1 | 6/2010 | Binder et al. |
| 2011/0126179 | A1 | 5/2011 | Hartman et al. |
| 2012/0174124 | A1 | 7/2012 | Ward et al. |
| 2014/0359582 | A1 * | 12/2014 | Needamangala ......... G06F 8/41 |
| | | | 717/130 |
| 2015/0370552 | A1 | 12/2015 | Hejlsberg et al. |
| 2019/0095187 | A1 * | 3/2019 | Benedek ............. G06F 9/44521 |

FOREIGN PATENT DOCUMENTS

WO        2007109717 A2    9/2007

OTHER PUBLICATIONS

Franz; "Dynamic linking of software components"; Mar. 1997; in Computer, vol. 30, No. 3, pp. 74-81. (Year: 1997).*

* cited by examiner

*Primary Examiner* — Umut Onat
(74) *Attorney, Agent, or Firm* — Renner, Otto, Boisselle & Sklar, LLP

(57) ABSTRACT

There is provided a method for changing the functionality of an executing software product in runtime through the use of dynamic procedures. There is further provided a corresponding computerized system, computer program and non-volatile data carrier containing the computer program.

12 Claims, 3 Drawing Sheets

DYNAMIC PROCEDURES FOR SOFTWARE PRODUCTS

TECHNICAL FIELD

The present invention relates to a method, computerized system, and computer program product for changing the functionality of a software product, without altering the software product itself.

BACKGROUND

One of the challenges when providing software applications, services or other products is how to allow for the same product to be used by multiple customers/users with somewhat different needs. In the simple case this can be achieved by making some features configurable, such as URLs, when to run backup, maximum number of users etc.

A static software library is a way to package functionality so that it can easily be included in the product and invoked from other code within the product. Libraries are used by the developer when the product is being built and the functionality is thereafter static.

A software framework is a special kind of library where the invocation works the other way around compared to a normal library by using object-oriented techniques such as polymorphism and dynamic binding. In the framework the framework invokes the product code. Typical applications are handling of user interface events—when an object is clicked the "OnClick" method is invoked, but it is up to the product developer to define what "OnClick" should do by overriding the functionality provided by the framework.

However, traditional frameworks are, just like libraries, used by the developer when the product is being built and the functionality is thereafter static.

Scripting is a method that allows the customer/user to define business logic/workflow actions to be invoked by the product at predefined trigger points. Scripts can be defined and stored in many different ways, e.g., as separate script files (as for Power shell) or by an embedded script file in the product itself (as for Excel). The scripts, except from the features in the script language, which can be quite extensive, usually also have access to a predefined set of operations or data in the product. Scrips are usually run by an interpreter. However, scripting can only access the predefined set of operations or data in the product, i.e., the set of operations or data variables that is explicitly exposed by the product developer, and its functionality is therefore static after development.

However, none of these existing solutions are satisfactory in view of providing a fast and flexible adaptation of the user workflow and data management, as well as a customization of the software product functionality. Thus, there exists a need for an improved solution.

SUMMARY

The object of the present invention is to eliminate or at least to minimize the problems discussed above. This is achieved by a method, computerized system, and computer program product for changing the functionality of a software product, without altering the software product itself according to the appended independent claims.

According to an aspect of the invention there is provided a method for changing the functionality of an executing software product in runtime, the method comprising providing, in a memory of a system, an executable software product, wherein the executable software product is generated using an object-oriented programming language. The executable software product comprises at least one first programming interface; at least one trigger point indicative of a location in the software code for invocation of one or more detected dynamic procedure associated with the respective trigger point; a trigger point detector, configured to detect one or more trigger point comprised in the executable software product; and a change detector configured to detect, in runtime, any addition, deletion or change of any dynamic procedure source code stored in the memory. The executable software product further comprises a runtime compiler, a runtime linker and a runtime loader configured to compile, link, and load dynamic procedure source code in runtime, i.e., during execution of the executable software product. The method further comprises providing, in the memory, dynamic procedure source code of at least one dynamic procedure designed to introduce a change in functionality in the executable software product, wherein the dynamic procedure source code of each dynamic procedure comprises at least one second programming interface, wherein each of the at least one second programming interface complies with one of the at least one first programming interface.

The method further comprises creating an executing program in a dynamic runtime environment by loading the executable software product using a system loader comprised in or communicatively connected to the system, and performing the following method steps in runtime, i.e., during execution of the executable software product:

detecting any addition, deletion or change of the dynamic procedure source code in the memory using the change detector;

compiling a selection of the dynamic procedure source code, using the runtime compiler; and linking the compiled dynamic procedure, using the runtime linker;

detecting one or more trigger point comprised in the executable software product by the trigger point detector;

in response to detection of one or more trigger point invoking, from the memory, one or more dynamic procedure associated with each detected trigger point; and loading, or executing, the one or more invoked dynamic procedure within the executing software product, using the runtime loader.

Suitably, altering of the functionality of the software product, here referred to as the executing software product, without altering the software product itself is thereby enabled, since the dynamic procedures that alter the software product execute as if they are part of the executing software product. Through the use of dynamic procedures use of all operations, classes and/or data variables in the software product on a source code level is thereby enabled, achieving adaptation on a per-customer/user level while still using the same product, i.e., without changing the binary code of the product. Thereby, a fast and flexible adaptation of the user workflow and data management, as well as a customization of the software product functionality is achieved.

In some embodiments, the method further comprises returning control to the executing software product after the last of the one or more dynamic procedure associated with each detected trigger point has been executed, by a processor comprised in the system and communicatively connected to the memory.

It should be noted that dynamic procedure source code may be provided in the memory before execution of the executable software product and/or during execution of the executable software product.

Optionally, suitable method steps may be performed repeatedly, as further described in the detailed description.

In one or more embodiment the executable software product is generated, during development, by: compiling software product source code into binary or intermediate code, by an external compiler; and linking the binary or intermediate code into an executable software product, by an external linker.

According to another aspect of the invention there is provided a computerized system for changing the functionality of an executing software product in runtime. The system comprises a memory configured to store an executable software product, wherein the executable software product is generated using an object-oriented programming language. The executable software product comprises at least one first programming interface; at least one trigger point indicative of a location in the software code for invocation of one or more detected dynamic procedure associated with the respective trigger point; a trigger point detector, configured to detect one or more trigger point comprised in the executable software product; and a change detector configured to detect, in runtime, any addition, deletion or change of any dynamic procedure source code stored in the memory. The executable software product further comprises a runtime compiler, a runtime linker and a runtime loader configured to compile, link, and load dynamic procedure source code in runtime, i.e., during execution of the executable software product. The memory is further configured to store dynamic procedure source code of at least one dynamic procedure designed to introduce a change in functionality in the executable software product, wherein the dynamic procedure source code of each dynamic procedure comprises at least one second programming interface, wherein each of the at least one second programming interface complies with one of the at least one first programming interface. The system further comprises or is communicatively connected to a system loader configured to create an executing program in a dynamic runtime environment by loading the executable software product into the memory. The change detector is configured to, in runtime, i.e., during execution of the executable software product, detect any addition, deletion or change of the dynamic procedure source code in the memory. The runtime compiler is configured to, in runtime, compile a selection of the dynamic procedure source code comprised. The runtime linker is configured to, in runtime, link the compiled dynamic procedures. The trigger point detector is configured to detect, in runtime, one or more trigger point comprised in the executable software product. The system is further configured to invoke from the memory, in runtime and in response to detection of one or more trigger point, one or more dynamic procedure associated with each detected trigger point; and the runtime loader is configured to, in runtime, load, or execute, the one or more invoked dynamic procedure within the executing software product.

In one or more embodiments, the system further comprising a processor communicatively connected to the memory, the processor being configured to return control to the executing software product after the last of the one or more dynamic procedure associated with each detected trigger point has been executed.

The system may be configured to perform suitable method steps repeatedly, as further described in the detailed description.

The memory may be configured to receive or retrieve, and store, dynamic procedure source code of at least one dynamic procedure in runtime, i.e., during execution of the executable software product.

The system may further be communicatively connected to an external compiler configured to compile software product source code into binary or intermediate code, and be communicatively connected to an external linker configured to link the binary or intermediate code into an executable software product during development, thereby generating the executable software product.

According to yet another aspect there is provided a computer program loadable into a non-volatile data carrier communicatively connected to a processing unit, the computer program comprising software for executing the method according any of the embodiments presented herein when the program is run on the processing unit.

According to still another aspect there is provided a non-volatile data carrier containing the computer program described above.

All advantages described herein in relation to one of the aspects of the invention are equally applicable to each of the other aspects.

DRAWINGS

The invention will now be described in more detail with reference to the appended drawings, wherein:

FIG. 1 discloses schematically a computerized system according to one or more embodiment of the invention;

Figure 1:
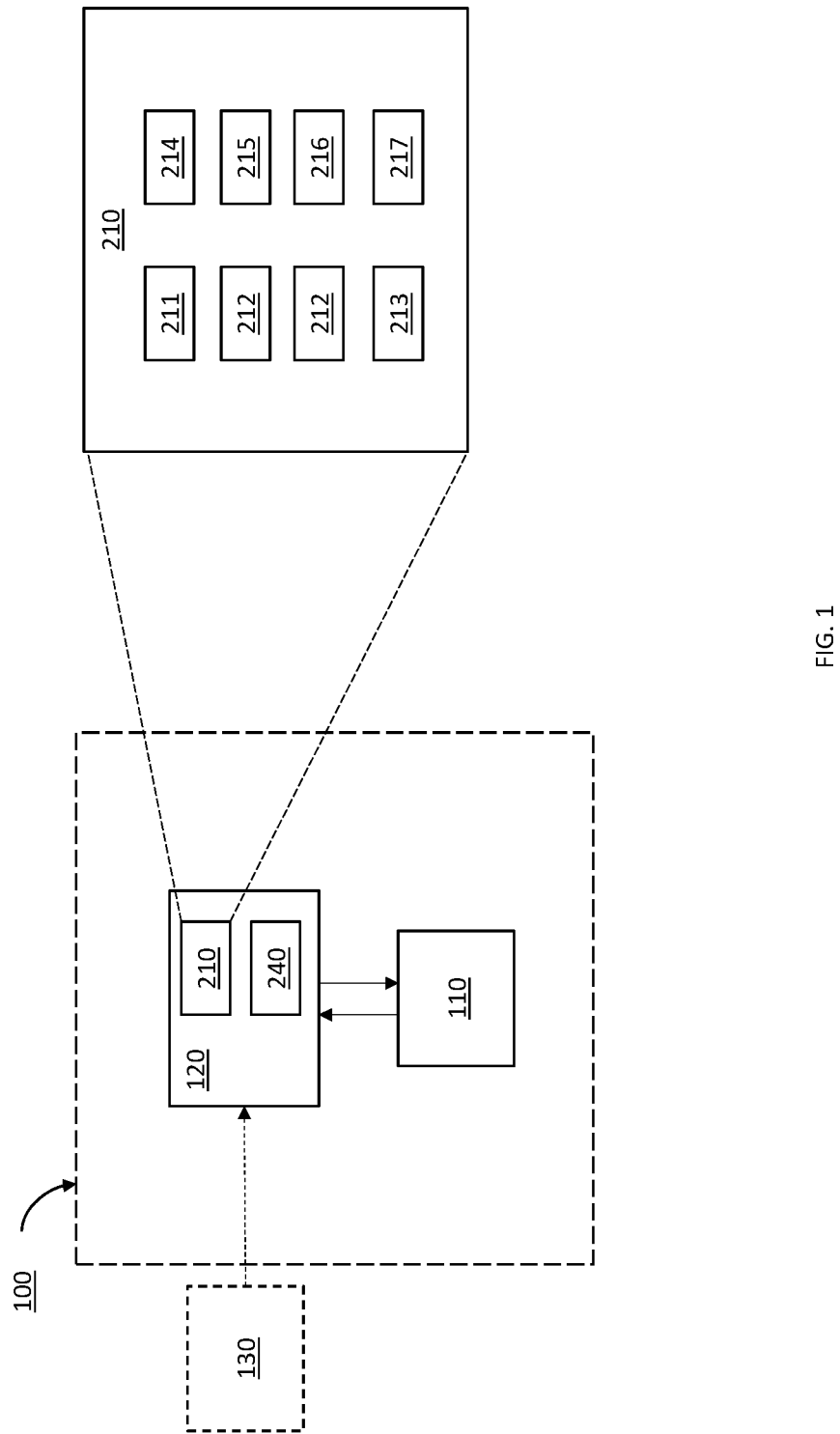

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Introduction

Consider a complex case where the business logic itself, i.e., the logic flow/workflow and the algorithms in a software product, needs to be adopted on a per-customer/user level—still using the same product, i.e., without changing the binary code of the product. For the previous solutions listed in the Background section there is a common problem of the software product functionality being static after development. To achieve adaptation on a per-customer/user level—still using the same product, i.e., without changing the binary code of the product, the inventors have realised that the solution needs to enable the customer/user to alter the functionality dynamically, at a timepoint after the development phase.

For example, traditional frameworks are, just like libraries, used by the developer when the product is being built and does not provide any way for the customer/user to change the functionality whereas scripting can only access the predefined set of operations or data in the product, i.e., the set of operations or data variables that is explicitly exposed by the product developer.

Other solutions that touch on the problem of providing a more dynamic approach are filter techniques, dynamic libraries, and stored procedures. However, none of these solutions are satisfactory in view of providing a fast and flexible adaptation of the user workflow and data management, as well as a customization of the software product functionality.

The filter technique, used by e.g., the IIS pipeline, offers custom defined logic to be "plugged in" and work together with the product. In the case of the IIS pipeline, the product is a web service, and the filter transforms incoming data, but the same basic technique can be applied in other situations to change functionality dynamically. But even though the filter in the case of IIS pipeline is defined using the same language as the product itself (e.g., C#) and is compiled in runtime, it basically has the same role as a script in relation to the product, i.e., it cannot access the internal operations or data variables in the product on a source code level. This is true even if IIS itself is considered to be the product. Even if the filter (from the IIS vendors point of view) is developed by the customer but compiled dynamically by IIS (the product), the filter is not executed within IIS but as an external program component.

Another example of related art aiming to add customization to a product without changing the original source code is found in the patent document US 2015/0370552 A1, which discloses a computer-implemented method of modifying execution behaviour of a programmatic unit of source code, by determining whether at least one customization is defined for the programmatic unit. In US 2015/0370552 A1, the "execution platform" executes the customized software via an execution pipeline, checking for each programmatic unit or block of code if any customizations have been attached or defined relative to programmatic unit and after that execute the block of code. In other words, detection of customizations is performed by the separate "execution platform" before execution of each sequential executable block of the executable software product, i.e., not in runtime and not by the executing software product itself. In addition, the solution of US 2015/0370552 A1 has the disadvantage that the merge of original source code and customizations requires access to the original source code.

This is in contrast to dynamic procedures which are executed within the executing software product, i.e., during execution of the software product in runtime, and thus have access to internal operations, classes and/or data variables in the product on a source code level. In other words, according to embodiments herein, dynamic procedures are enabled to execute as if they are a part of the executing software product and already linked with it whereby the dynamic procedures are provided access to the same internal operations, classes and/or data variables as the executing software product itself. In the source code of the dynamic procedures, the names, references or symbols of internal operations, classes and/or data variables given in the source code of the software product are used. In embodiments of the present invention, as described herein, the software product has in the development phase been adapted to include trigger points, e.g., pre-set locations in the source code at which the executable code can be altered during execution that trigger execution of detected dynamic processes during execution of the executable software product, i.e., in runtime. For illustrational purposes only, the trigger points may e.g., be compared to links, which are introduced once into the source code and remain static, but where the content, functions, dynamic processes, or the like with which the link or trigger point is associated can be altered at any time. Advantageously, as described herein, this means that the developer does not need to have access to the original source code of the software product or a copy thereof. A further significant advantage is that the execution of the executable software product does not have to be started over each time a new customization is introduced, since the runtime compiler, linker and loader are configured to compile, link and load software code of any dynamic process that is associated with a specific trigger point, which trigger point is already defined as part of the software product. In addition, any number of links can advantageously be associated with the same trigger point simultaneously, enabling separate customizations for different users, typically different customers using the same runtime instance of the software product.

A dynamic library (or dynamic link library, dll) is a library that can be loaded dynamically by the product and thus be used to change the functionality provided by the entire product dynamically. The dynamic library provides an interface to a set of operations that can be invoked by the product. The key is that even if the interface itself must be known to the product when the product is created, the implementation of those operations can be changed dynamically. Typical applications are adaptors or drivers, e.g., a printer driver where the print-command is implemented differently for different printers. However, just as for scrips and filters, a dynamic library does not access the operations or data variables in the product on a source code level (if not designed as a dynamic procedure).

A stored procedure is a method used by database engines to encapsulate logic that operates upon data in the database and data passed as argument. The typical use is to reuse complex queries and maintain application level consistency. Stored procedures can be defined dynamically by the customer, i.e., they are not part of the database and are usually accessible by the customer even when bundled with the product that uses the database (the software product/software application). Thus, stored procedures can be considered a technique to change functionality of a product without changing the product itself. However, just as for scrips and filters, a stored procedure does not access the operations or data variables in the application product on a source code level.

The inventors have realised that using dynamic procedures, according to embodiments presented herein, the problems above are solved or at least ameliorated. Through the use of dynamic procedures use of all operations, classes and/or data variables in the software product on a source code level is enabled, thereby achieving adaptation on a per-customer/user level—still using the same product, i.e., without changing the binary code of the product.

Dynamic procedures are herein defined as methods that allows business logic/workflow etc. to be dynamically defined and embedded into the software product/software application in such a way that it is given access to the operations and data variables in the software product/software application on a source code level, without changing the actual product, as described in embodiments herein.

The key to dynamic procedures is that they are defined in the same native language as the product itself and dynamically compiled in runtime by the product itself. They are then executed within the same process and memory as the product itself and thereby given access to the operations and data variables in the product on a source code level.

Since being compiled the dynamic procedures will execute as fast as native code. And since the compilation is done only when the product is initialized or when the dynamic procedure is modified, the performance overhead is neglectable.

In other words, a dynamic procedure (DP) is a software subroutine that defines a piece of logic, typically some custom specific workflow. The interface of the dynamic procedure complies with one of the interfaces defined by the software product in which it shall be used, the host, typically by inheriting from an interface definition.

The host, which may be a host application or a host device, is herein defined as a user's software product instance, or the user's "account" if provided as a service.

The dynamic procedure is defined (programmed) using the same programming language as the host, e.g., but not limited to C#. The dynamic procedure is compiled in runtime, dynamically, by the host itself and integrated in the host runtime environment in such a way that it is given access to the same process and memory as the host itself, according to embodiments presented herein. The dynamic procedure is invoked by the host at trigger points defined by the host. Once the dynamic procedure is invoked it has access to all the operations, classes and/or variables that are available to the software product, on a source code level.

Uses for dynamic procedures include both automated workflow mechanisms and data-validation. Furthermore, dynamic procedures can consolidate and centralize logic individually for different customers, that was traditionally needed to be implemented in the application. As a non-limiting example, the business logic or workflow rules of a specific software product may include a rule controlling that if an email is sent by a user of a software product instance and the recipient email address is invalid, the email is sent to collecting email address. The rule is implemented in the source code of the software product. Suppose that a user of the software product is interested in applying a second rule related to automatic sending of emails. Even if the address lists are available in the memory or database, the control of such a function is implemented in the core, i.e., source code, of the software product and is therefore not accessible via an SQL script, which is not technically enabled to call functions in the core of the software product. Upon request from the user the product owner traditionally has two options: 1) to expand the original software product to include the new function, or 2) to develop a customer specific version of the software product, for this user and any other who asks for the same adaptation. The disadvantages with option 1) are that the software product will grow successively to include all user requested additions, and that changes and that the product cycle, from one version release to the next, will increase. The software product will also be harder to overview and maintain as it grows. The disadvantages with option 2) are that the number of versions will increase, thereby making product maintenance a difficult issue. The advantage of having a single standard software product is also lost. Using dynamic procedures, a further option 3) emerges, allowing the product owner to keep the standard product intact, as a single version, and implement the required functionality change using a dynamic procedure, as described in embodiments herein.

This separation of business logic/workflow from the product core simplifies the configuration and adaption of user workflow and data management and allows for highly customized functionality. This will also allow for a more flexible and faster adaption to individual customer workflow needs since this can be done without changing or distributing new versions of the product.

Use Case Examples

The customer/user of the software product could be any party or organisation that could have an interest in specific adaptation and configuration of software system's functionality and access of data.

In the text below the Healthcare industry is used as an example and the typical customer would then be any organisation having interest in patient's registered quantitative or qualitative data described and could be public or private healthcare, academic research projects, life science industry research projects, public/private registries, qualitative registries, bio banks, health authorities etc.

Typically, a customer/user will use a product with a database and the business logic is represented as workflow functionality or any kind of functionality related to such as access to registering number of steps, weight, electrocardiography measures, spirometer measures, blood pressure, degree of patient's perceptive of pain etc. or access to edit patient phone number.

Execution of functionality means that the dynamic procedure becomes the main function controlling calling other functions in the program, also including the possibility to reject the user the possibility to call one or several functions.

Example 1) dynamic procedures can be used for automatically triggering the next step in a workflow related for a patient that is to undertake an upcoming knee surgery, e.g., not until a patient has confirmed a date for surgery will the patient's to-do list be illustrated for the patient. Dynamic procedures are used to save time and money when customers wish to apply the application to their specific workflow needs.

Example 2) A product for activity planning has some built-in business logic for dealing with different activity types. E.g., "recurring activities" do not post on dates that has passed. Such business logic is typically implemented in the products "application layer", not in the database.

Assuming there is a customer that needs to modify or redefine the workflow described in example 1. Regardless of method, the workflow definition must then access the application layer to make use of the built-in business logic.

Note that the business logic usually constitutes the core of the product and by-passing the business logic in this example by accessing the products database level directly requires the business logic being re-implemented which is contradictory to the reason why the product was used in the first place.

By using dynamic procedures such customer specific requirements can be done without needing to change the application core or database management system.

Dynamic procedures need not be customer specific. On the contrary, such algorithms used for standardized calculations (e.g., medical scores such as BMI, PASI and DLQI) are well suited to be packaged as dynamic procedures.

But note, just because the calculation is standardized it does not mean it benefits from being a part of the product itself. That would lead to including all calculations for all customers, which would make the product unnecessarily big. In addition, "standardized" does not necessarily mean that it is done the same way. A BMI calculation may e.g., differ in how the input data is retrieved or whether standard deviation should also be calculated etc.

Dynamic procedures can be granted other access rights than the users have that trigger those dynamic procedures.

This might seem as a potential security breach, but keep in mind that it is not the individual user that defines the dynamic procedures, but the customer (i.e., the same organization that grants users access rights in the first place). Dynamic procedures can be used as a lifeline, i.e., a way to allow operations that are crucial but normally not allowed. E.g., aggregating statistics from data that the user normally has no access to. Dynamic procedures can also be used to protect against injection attacks where a user via a client program sends (malicious) data to a server to invoke unwanted behaviour.

Firstly, the dynamic procedures are invoked by the host, i.e., the server, not by the client directly. Secondly, the parameters passed to dynamic procedures are already plain data (on a source code level). This is in contrast to e.g., stored procedures, where an SQL-command containing both commands and data is parsed, which allows for opens for (malicious) data being parsed as commands.

System Architecture

The system architecture will now be described in connection with FIGS. 1 and 2.

Figure 2:
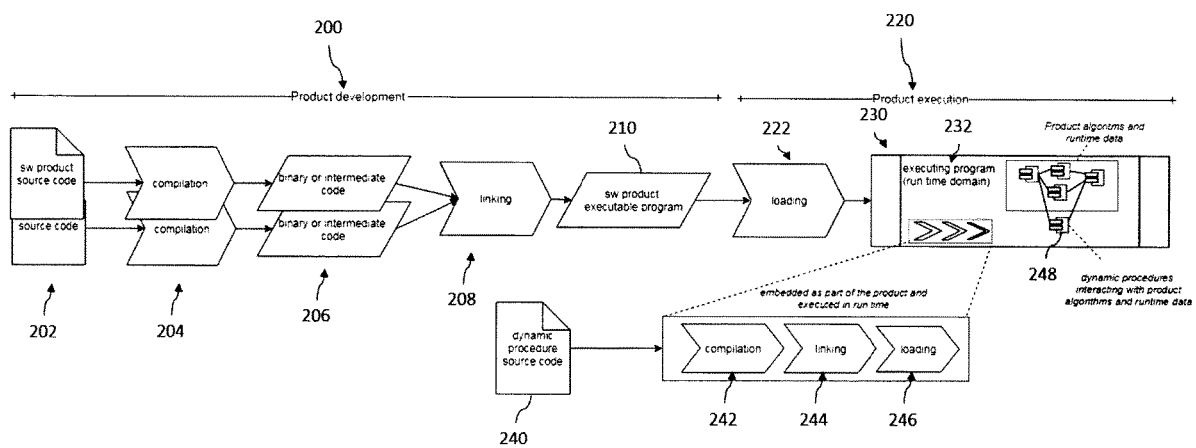
FIG. 2 is a schematic view of development and execution of a software product in a runtime environment, including use of dynamic procedures according to one or more embodiment of the invention.

FIG. 1 shows a schematic view of a computerized system 100 for changing the functionality of an executing software product 230 in runtime. FIG. 2 is a schematic view of development and execution of a software product in a runtime environment. The product development phase is herein denoted 200 and the product execution phase is denoted 220. As shown in FIG. 2, the steps and functions leading up to the generation of the executable software product 210 are part of the product development phase 200, while loading 222 of the executable software product 210 and all steps and functions performed in runtime, i.e., during execution of the executable software product 210 within the dynamic runtime environment 230, are part of the product execution phase 220.

The system 100 comprises a memory 120 configured to store an executable software product 210, wherein the executable software product 210 is generated using an object-oriented programming language. The executable software product 210 comprises at least one first programming interface 211; at least one trigger point 212 indicative of a location in the software code for invocation of one or more detected dynamic procedure associated with the respective trigger point 212 and a trigger point detector 213, configured to detect one or more trigger point 212 comprised in the executable software product 210. The executable software product 210 further comprises a change detector 214 configured to detect, in runtime, any addition, deletion or change of any dynamic procedure source code 240 stored in the memory 120 and a runtime compiler 215, a runtime linker 216 and a runtime loader 217 configured to compile 242, link 244, and load 246 dynamic procedure source code in runtime, i.e., during execution of the executable software product 210. The memory 120 is further configured to store dynamic procedure source code 240 of at least one dynamic procedure designed to introduce a change in functionality in the executable software product 210, wherein the dynamic procedure source code 240 of each dynamic procedure comprises at least one second programming interface, wherein each of the at least one second programming interface complies with one of the at least one first programming interface.

The system further comprises or is communicatively connected to a system loader 140 configured to create an executing program 232 in a dynamic runtime environment 230 by loading 222 the executable software product 210 into the memory 120.

The change detector 214 is configured to, in runtime, i.e., during execution of the executable software product 210, detect any addition, deletion or change of the dynamic procedure source code 240 in the memory 120.

The runtime compiler 215 is configured to, in runtime, compile 242 a selection of the dynamic procedure source code and the runtime linker 216 is configured to, in runtime, link 244 the compiled dynamic procedures.

The change detector 214 may be configured to detect such an addition, deletion or change in runtime by comparing the dynamic procedure source code 240 in the memory 120, i.e., previously compiled and linked dynamic procedure source code 240, to corresponding dynamic procedure source code stored in a repository accessible to the system 100. The dynamic procedure source code stored in the repository may be altered by developers who are enabled through a suitable interface to introduce additions, deletions and/or changes to the dynamic procedure source code stored in the repository. In these embodiments, the change detector 214 is configured to detect that there is an addition, deletion or change to the dynamic procedure source code 240 if the comparison shows that there is a difference between the dynamic procedure source code 240 in the memory 120 and the dynamic procedure source code stored in the repository. By detecting any such addition, deletion or change to the dynamic procedure source code 240, in the above manner or in any other suitable manner, the change detector 214 further causes a selection of dynamic procedure source code 240 for compilation, and linking, to be made.

The selection may e.g., comprise all dynamic procedures stored in the dynamic source code repository, only the stored dynamic procedures that have been altered, or the stored dynamic procedures that have been altered and any stored dynamic procedure that depend on one of the altered dynamic procedures.

The selection of dynamic procedure source code 240 for compilation 242 by the runtime compiler 215 and linking 244 by the runtime linker 216 is thus based on, and performed in response to, the detection of any addition, deletion or change of the dynamic procedure source code 240. The system 100 may therefore in turn be configured to, in runtime, perform a selection of dynamic procedure source code for compilation and linking, from the dynamic procedure source code repository, in response to the change detector 215 detecting at least one addition, deletion or change of the dynamic procedure source code 240. The system 100 may be configured to select for compilation and linking all dynamic procedures stored in the repository, only the stored dynamic procedures that have been altered, or the stored dynamic procedures that have been altered and any stored dynamic procedure that depend on one of the altered dynamic procedures, depending on which selection rules are applied. Since the detection of any addition, deletion or change of the dynamic procedure source code causes selection of dynamic procedure source code 240 for compilation and linking, and further causes compilation 242 and linking 244 of the selection of dynamic procedure source code, the change detector 214 may also be referred to as a compilation trigger.

The trigger point detector 213 is configured to detect, in runtime, one or more trigger point comprised in the executable software product 210. The system 100 is in turn configured to invoke from the memory 120, in runtime and in response to detection of one or more trigger point, one or more dynamic procedure associated with each detected trigger point.

Thereafter, the runtime loader 217 is configured to, in runtime, load 246, or execute, the one or more invoked dynamic procedure 248 within the executing software product. In other words, the runtime loader 217 is configured to, in runtime, load 246, or execute, the one or more invoked dynamic procedure 248 within the executing program 232, in the dynamic runtime environment 230. Since the detection of one or more trigger point comprised in the executable software product 210 causes execution of one or more dynamic procedure associated with each detected trigger point, the trigger point detector 213 may also be referred to as an execution trigger.

Any number of dynamic procedure may advantageously be associated with the same trigger point simultaneously. The system 100 may be configured to invoke from the memory 120, in runtime and in response to detection of one or more trigger point, one or more dynamic procedure associated with each detected trigger point dependent on at least one rule accessible to the system 100, e.g., stored in the memory 120, wherein the at least one rule governs which of the dynamic procedures associated with a certain trigger point are to be invoked. As a non-limiting example, each of a number of clients may be using a common instance of the software product, wherein information is stored in the memory regarding which dynamic procedures are associated with which client. Thereby, customization of the software product instance for each client is enabled. Furthermore, in this case the change detector 214 need only detect any addition, deletion or change in the dynamic procedure source code 240 associated with the specific client, thereby making the change detection and the subsequent processing as described herein less computationally expensive.

The system 100 may further comprise a processor 110 communicatively connected to the memory 120, the processor 110 being configured to return control to the executing software product after the last of the one or more dynamic procedure associated with each detected trigger point has been executed.

The memory 120 may further be configured to store dynamic procedure source code 240 of at least one dynamic procedure in runtime, i.e., during execution of the executable software product 210.

The computerized system may further be communicatively connected to an external compiler configured to compile 204 software product source code 202 into binary or intermediate code 206, wherein the system 100 is further communicatively connected to an external linker configured to linking 208 the binary or intermediate code 206 into an executable software product 210 during development, thereby generating the executable software product 230. As shown in FIG. 2, the compilation 204 by the external compiler and the linking 208 by the external linker are performed during the product development phase 200 leading up to the generation of the executable software product 210, i.e., not in runtime.

Method Embodiments

One of more method embodiments will now be described in connection with FIG. 3.

Figure 3:
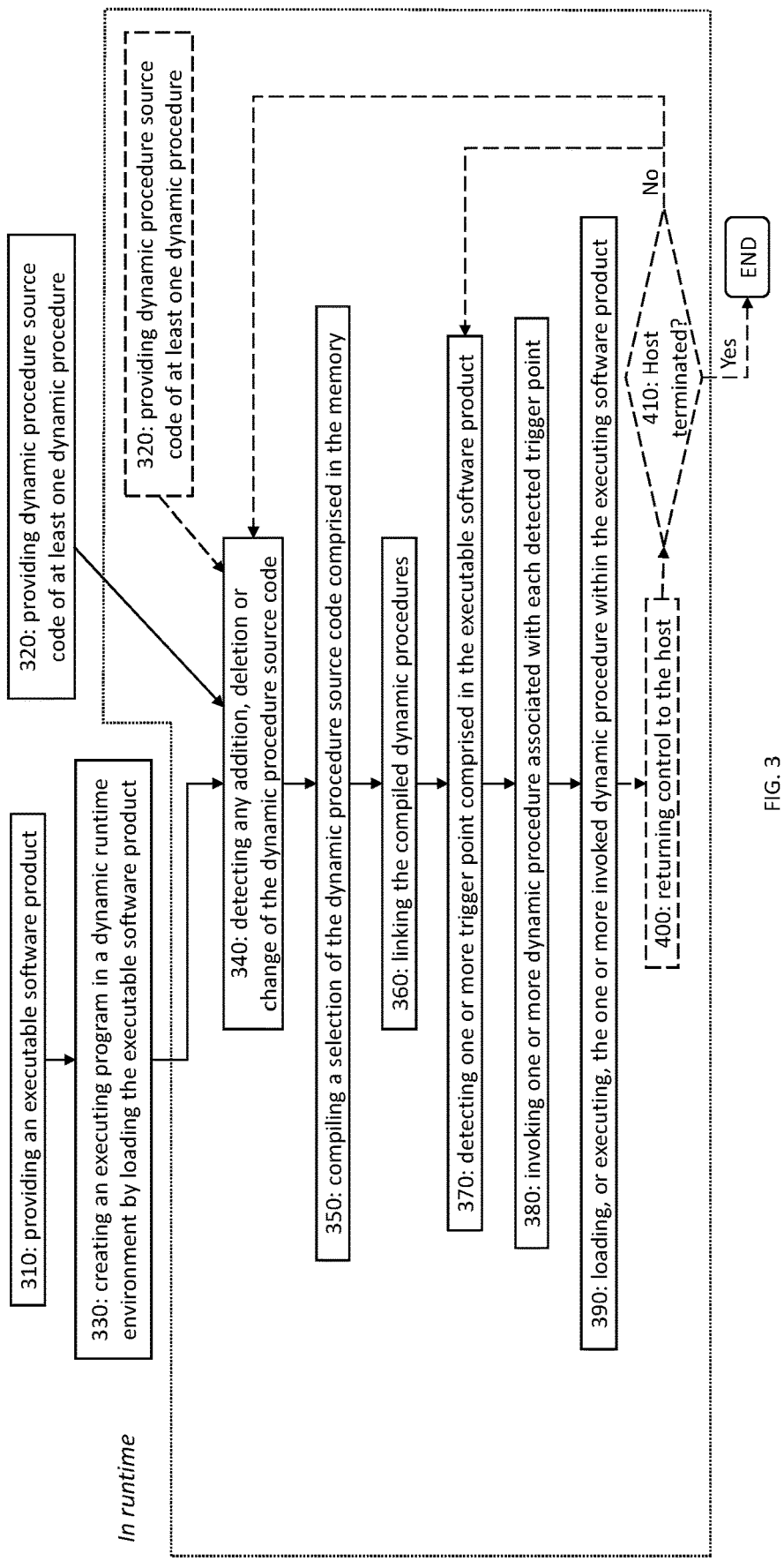
FIG. 3 is a flow chart of a method according to one or more embodiment of the invention.

FIG. 3 shows a flow chart of a method for changing the functionality of a software product (software program, software application) without changing the software product itself, which may also be referred to as a method of using dynamic procedures, the method comprising:

In step 310: providing, in a memory 120 of a system 100, an executable software product 210, wherein the executable software product 210 is generated using an object-oriented programming language.

The executable software product 210 comprises:
at least one first programming interface 211;
at least one trigger point 212 indicative of a location in the software code for invocation of one or more detected dynamic procedure associated with the respective trigger point 212;
a trigger point detector 213, configured to detect one or more trigger point 212 comprised in the executable software product 210;
a change detector 214 configured to detect, in runtime, any addition, deletion or change of any dynamic procedure source code 240 stored in the memory 120; and
a runtime compiler 215, a runtime linker 216 and a runtime loader 217 configured to compile, link, and load dynamic procedure source code in runtime, i.e., during execution of the executable software product 210.

The executable software product 230 has before the start of the method according to FIG. 3 typically generated, during development, by compiling 204 software product source code 202 into binary or intermediate code 206, by an external compiler communicatively connected to the system 100; and linking 208 the binary or intermediate code 206 into an executable software product 210, by an external linker.

In one or more embodiments, the software product may be designed, during development, to allow hosting of dynamic procedures by: providing a software product by using an object-oriented programming language, in a dynamic runtime environment; defining a specification of programming interfaces in the source code for each potential dynamic procedure; inserting one or more dynamic procedure trigger point (hereinafter referred to as trigger point), in the software product source code, i.e. one or more point in the software product source code where a selection of the dynamic procedures stored in the memory 120 are to be invoked; and inserting functionality to detect, in runtime, new, deleted or changed dynamic procedures source code, e.g. in the form of the change detector 214. Designing the software product, during development, to allow hosting of dynamic procedures may in these embodiments further include inserting functionality into the software product source code to compile and link the dynamic procedure source code in runtime, e.g., in the form of the runtime compiler 215 and runtime linker 216, taking into account that the dynamic procedure source code may contain references to data, and operations provided by the executing software product itself. To achieve this, the symbols, i.e., the addresses of data variables and operations, in the executing software product itself are passed as input to the runtime compiler and runtime linker. Designing the software product, during development, to allow hosting of dynamic procedures may in these embodiments further include inserting functionality into the software product source code to load the compiled and linked dynamic procedure source code in runtime, e.g., in the form of the runtime loader 217. In these embodiments, any, or all of the runtime compiler 215, the runtime linker 216 and the runtime loader are in other words part of the executable software product 210 itself and thereby configured to operate during execution of the executable software product, i.e., in runtime.

The software product is typically installed either as separate instances on user devices or hosted centrally as a service (software as a service, SAAS) by a service provider. Users with user devices on which a software product instance is installed, or users having an account or the like accessing the SAAS, may be e.g., companies or organisations that are interested in adapting or customizing the software product for use by their respective client base. One or more user of the respective user devices or accounts may e.g., have needs to adopt the software product to conform to customized and/or specific requirements. To meet this need, designing the software product, during development, may further comprise receiving or defining requirements or rules for a specific customization of the software product and assessing whether the requirements can be fulfilled by dynamic procedures already provided in the software product. This is technically limited by the interfaces and trigger points designed into the software product but must also be assessed in view of the scope of the product. For instance, we assume that a software product is designed to handle e-forms filled out by users and comprises a dynamic procedure trigger point that is invoked when an e-form is submitted by a user. This can be used to invoke a dynamic procedure that sends a confirmation e-mail to the user ("Thanks for your answer"). However, the same software product may have no trigger point that is invoked when the user is logging out. Thus, it is not possible at this point to trigger a dynamic procedure to send an e-mail confirmation for logging out ("Thanks for your visit"). If it is determined that the requirements for a customization can be fulfilled by dynamic procedures provided in the software product, designing the software product, during development, may further comprise generating one or more dynamic procedure in response to the fulfilled requirements. After generation, the one or more dynamic procedures are typically tested in manners known in the art.

In step 320: providing, in the memory 120, dynamic procedure source code 240 of at least one dynamic procedure designed to introduce a change in functionality in the executable software product 210, wherein the dynamic procedure source code 240 of each dynamic procedure comprises at least one second programming interface, wherein each of the at least one second programming interface complies with one of the at least one first programming interface.

As indicated in FIG. 3, dynamic procedure source code, which may indicate one or more dynamic procedure to be added, or removal or alteration of a previously stored dynamic procedure, may be provided in step 320 before creating an executing program in step 330, in parallel with creating an executing program in step 330, and/or after creating an executing program in step 330, i.e., in runtime. The dynamic procedure source code may thereby be present in the memory 120 when the inventive method starts. Alternatively, or in combination, dynamic procedure source code may be received or retrieved in the memory 120 during execution of the executable software product 210, e.g., from a storage device 130 external to and communicatively connected to the system 100. Alternatively, or in combination, an instruction to remove or alter dynamic procedure source code may be received or retrieved in the memory 120 during execution of the executable software product 210, e.g., from the external storage device 130, whereby a removal or alteration of the dynamic procedure source code corresponding to, the alteration instruction is performed by the processor 110 in response to receiving the instruction. Such new dynamic procedure source code and/or instructions for removal and/or alteration may be generated in response to a user, e.g., a developer, providing input via an input device connected to the external storage device 130. The external storage device 130 may also be configured to send new dynamic procedure source code and/or instructions for removal and/or alteration to the memory 120 in response to input from a user via the input device.

In step 330: creating an executing program 232 in a dynamic runtime environment 230 by loading the executable software product 210 using a system loader comprised in or communicatively connected to the system 100.

The method continues with steps 340 to 390, which are performed in runtime, i.e., during execution of the executable software product 210, comprising:

In step 340: detecting any addition, deletion or change of the dynamic procedure source code 240 in the memory 120 using the change detector.

Step 340 may further comprise detecting, by the change detector 214, any addition, deletion or change in runtime by comparing the dynamic procedure source code 240 in the memory 120, i.e., previously compiled and linked dynamic procedure source code 240, to corresponding dynamic procedure source code stored in a repository accessible to the system 100. The dynamic procedure source code stored in the repository may be altered by developers who are enabled through a suitable interface to introduce additions, deletions and/or changes to the dynamic procedure source code stored in the repository. In these embodiments, Step 340 may further comprise detecting that there is an addition, deletion or change to the dynamic procedure source code 240 if the comparison shows that there is a difference between the dynamic procedure source code 240 in the memory 120 and the dynamic procedure source code stored in the repository.

Detection of any such addition, deletion or change to the dynamic procedure source code 240, in the above manner or in any other suitable manner, further causes a selection of dynamic procedure source code 240 for compilation, and linking, to be made. The selection of dynamic procedure source code 240 for compilation by the runtime compiler 215 and linking by the runtime linker 216 in step 350 and 360 is thus based on, and performed in response to, the detection of any addition, deletion or change of the dynamic procedure source code 240.

In step 350: compiling a selection of the detected dynamic procedure source code 240, using the runtime compiler 215.

Step 350 may further comprise or be preceded by a method step of selecting, by the system 100, dynamic procedure source code for compilation and linking, from the dynamic procedure source code repository, in response to the change detector 215 detecting at least one addition, deletion or change of the dynamic procedure source code 240.

The selection may e.g. comprise selecting, from the dynamic procedures stored in the dynamic procedure source code repository, all stored dynamic procedures, only the stored dynamic procedures that have been altered, or the stored dynamic procedures that have been altered and any stored dynamic procedure that depend on one of the altered dynamic procedures, depending on which selection rule is applied.

In step 360: linking the compiled dynamic procedure, using the runtime linker 216.

In step 370: detecting one or more trigger point comprised in the executable software product 210 by the trigger point detector 213.

In one or more embodiments, the trigger point detector 213 may be configured to detect a trigger point by detecting a first programming interface 211 in the software program source code and determining mapping the detected first programming interface 211 with one or more stored dynamic procedure in the memory 120 having a second programming interface that matches the detected first programming interface.

In step 380: in response to detection of one or more trigger point invoking, from the memory 120, one or more dynamic procedure associated with each detected trigger point.

In step 390: loading, or executing, the one or more invoked dynamic procedure within the executing software product, using the runtime loader 217.

In other words, step 390 comprises loading, or executing, the one or more invoked dynamic procedure within the executing program 232, in the dynamic runtime environment 230, using the runtime loader 217.

In one or more embodiment, executing the one or more dynamic procedure comprises accessing data and operations in the host, or the executing software product 232, also referred to herein as the executing program 232, on a source code level.

In one or more embodiment the method may further comprise:

In an optional step 400: returning, by a processor 110 comprised in the system 100 and communicatively connected to the memory 120, control to the executing software product or executing program 232 after the last of the one or more dynamic procedure associated with each detected trigger point has been executed.

In an optional step 410: checking of the host is terminated.

If optional step 410 is performed and it is determined that the host is terminated, the method is ended.

In some embodiments, if optional step 410 is performed and it is determined that the host is not terminated, the method returns to step 370 to look for another trigger point. In other embodiments, if optional step 410 is performed and it is determined that the host is not terminated, the method returns to step 340 to look for changes of the dynamic procedure source code.

In other words, in one or more embodiment, steps 340 to 390 or steps 370 to 390, and optionally also steps 400 and 410 in combination with any of these alternatives, may be performed repeatedly.

Thereby, the host may keep executing until a trigger point is reached and the invocation sequence is repeated, or until the host is terminated.

Further Embodiments

In one or more embodiments, the system may be configured to perform any or all of the relevant method steps and functions presented herein.

All of the method/process steps, as well as any subsequence of steps, described with reference to FIG. 3 above may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

In some embodiments, there is provided a computer program loadable into a non-volatile data carrier communicatively connected to a processing unit, the computer program comprising software for executing the method according any of the method embodiments presented herein when the program is run on the processing unit. In some embodiments, there is provided a non-volatile data carrier containing the computer program.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage.

Any reference signs in the claims should not be construed as limiting the scope.

It is also to be noted that features from the various device or method embodiments described herein may freely be combined, unless it is explicitly stated that such a combination would be unsuitable.

The invention claimed is:

1. A computerized method for changing a functionality of an executing software product in runtime, the method comprising:

a. providing, in a memory of a system, the executable software product, wherein the executable software product is generated using an object-oriented programming language, the executable software product comprising:

i) at least one first programming interface;

ii) at least one trigger point, wherein each of the at least one trigger point is indicative of a location in a software code of the software product for invocation of at least one detected dynamic procedure associated with the trigger point;

iii) a change detector configured to detect, in runtime, any addition, deletion or change of any dynamic procedure source code stored in the memory and to, in runtime, trigger compilation of a selection of the dynamic procedure source code comprised in the memory in response to detection of any addition, deletion or change of any dynamic procedure source code stored in the memory;

iv) a trigger point detector, configured to detect, in runtime, the at least one trigger point comprised in the executable software product and to, in runtime, trigger invocation and execution of at least one dynamic procedure associated with each detected trigger point in response to detection of the at least one trigger point; and v) a runtime compiler, a runtime linker and a runtime loader configured to compile, link, and load the dynamic procedure source code in runtime, i.e., during execution of the executable software product;

b. providing, in the memory, the dynamic procedure source code of at least one dynamic procedure designed to introduce a change in the functionality in the executable software product, wherein the dynamic procedure source code of each of the at least one dynamic procedure comprises at least one second programming interface that complies with one of the at least one first programming interface;

c. creating an executing program in a dynamic runtime environment by loading the executable software product using a system loader comprised in or communicatively connected to the system, and in runtime, i.e., during execution of the executable software product:

d. detecting any addition, deletion or change of the dynamic procedure source code in the memory using the change detector;

e. compiling a selection of the dynamic procedure source code, using the runtime compiler; and f. linking the compiled selection of the dynamic procedure source code, using the runtime linker;

g. detecting the at least one trigger point comprised in the executable software product, by detecting a first programming interface in the source code of the software product, by the trigger point detector;

h. in response to the detection of the at least one trigger point, for each of the at least one detected trigger point:
i) mapping, by the trigger point detector, the detected first programming interface with one or more stored dynamic procedure in the memory having a second programming interface that matches the detected first programming interface and
ii) invoking, from the memory, the at least one dynamic procedure associated with the detected trigger point; and i. loading, or executing, the at least one invoked dynamic procedure within the executing program, using the runtime loader.

2. The method of claim 1, further comprising returning, by a processor comprised in the system and communicatively connected to the memory, control to the executing program after the last of the at least one dynamic procedure associated with the at least one detected trigger point has been executed.

3. The method of claim 1, wherein the method steps d to i of claim 1 are performed repeatedly.

4. The method of claim 3, wherein the method step b of claim 1 is also performed repeatedly.

5. The method of claim 1, wherein step b is performed before, in parallel with or after step c.

6. The method of claim 1, wherein the executable software product is generated, during development, by:
compiling software product source code into binary or intermediate code, by an external compiler communicatively connected to the system; and
linking the binary or intermediate code into the executable software product, by an external linker.

7. A computerized system for changing a functionality of an executing software product in runtime, the system comprising:
a memory storing the executable software product, wherein the executable software product is generated using an object-oriented programming language, the executable software product comprising:
i) at least one first programming interface;
ii) at least one trigger point, wherein each of the at least one trigger point is indicative of a location in a software code of the software product for invocation of at least one detected dynamic procedure associated with the trigger point;
iii) a change detector configured to detect, in runtime, any addition, deletion or change of any dynamic procedure source code stored in the memory and to, in runtime, trigger compilation of a selection of the dynamic procedure source code comprised in the memory in response to detection of any addition, deletion or change of any dynamic procedure source code stored in the memory;
iv) a trigger point detector, configured to detect at least one trigger point comprised in the executable software product; and
v) a runtime compiler, a runtime linker and a runtime loader configured to compile, link, and load the dynamic procedure source code in runtime, i.e., during execution of the executable software product;

wherein the memory further stores the dynamic procedure source code of at least one dynamic procedure designed to introduce a change in the functionality in the executable software product, wherein the dynamic procedure source code of each of the at least one dynamic procedure comprises at least one second programming interface that complies with one of the at least one first programming interface;

wherein the system further comprises or is communicatively connected to a system loader configured to create an executing program in a dynamic runtime environment by loading the executable software product into the memory;

wherein the change detector is configured to, in runtime, i.e., during execution of the executable software product, detect any addition, deletion or change of the dynamic procedure source code in the memory;

wherein the runtime compiler is configured to, in runtime, compile a selection of the dynamic procedure source code; and wherein the runtime linker is configured to, in runtime, link the compiled selection of the dynamic procedure source code;

wherein the trigger point detector is configured to detect, in runtime, the at least one trigger point comprised in the executable software product by detecting a first programming interface in the source code of the software product, and mapping the detected first programming interface with one or more stored dynamic procedure in the memory having a second programming interface that matches the detected first programming interface; and wherein the system is configured to invoke from the memory, in runtime and in response to the detection of the at least one trigger point, the at least one dynamic procedure associated with the at least one detected trigger point; and wherein the runtime loader is configured to, in runtime, load, or execute, the at least one invoked dynamic procedure within the executing program.

8. The computerized system of claim 7, further comprising a processor communicatively connected to the memory, the processor being configured to return control to the executing program after the last of the at least one dynamic procedure associated with the at least one detected trigger point has been executed.

9. The computerized system of claim 7, wherein the memory further stores dynamic procedure source code of the at least one dynamic procedure in runtime, i.e., during execution of the executable software product.

10. The computerized system of claim 7, wherein the system is communicatively connected to an external compiler configured to compile software product source code into binary or intermediate code, wherein the system is further communicatively connected to an external linker configured to link the binary or intermediate code into the executable software product during development, thereby generating the executable software product.

11. A non-transitory computer-readable storage medium including executable program instructions thereon that, when executed by at least one processing unit, execute a method comprising:
   a. providing, in a memory of a system, the executable software product, wherein the executable software product is generated using an object-oriented programming language, the executable software product comprising:
      i) at least one first programming interface;
      ii) at least one trigger point, wherein each of the at least one trigger point is indicative of a location in a software code of the software product for invocation of at least one detected dynamic procedure associated with the trigger point;
      iii) a change detector configured to detect, in runtime, any addition, deletion or change of any dynamic procedure source code stored in the memory and to, in runtime, trigger compilation of a selection of the dynamic procedure source code comprised in the memory in response to detection of any addition, deletion or change of any dynamic procedure source code stored in the memory;
      iv) a trigger point detector, configured to detect, in runtime, the at least one trigger point comprised in the executable software product and to, in runtime, trigger invocation and execution of at least one dynamic procedure associated with each detected trigger point in response to detection of the at least one trigger point; and
      v) a runtime compiler, a runtime linker and a runtime loader configured to compile, link, and load the dynamic procedure source code in runtime, i.e., during execution of the executable software product;
   b. providing, in the memory, the dynamic procedure source code of at least one dynamic procedure designed to introduce a change in the functionality in the executable software product, wherein the dynamic procedure source code of each of the at least one dynamic procedure comprises at least one second programming interface that complies with one of the at least one first programming interface;
   c. creating an executing program in a dynamic runtime environment by loading the executable software product using a system loader comprised in or communicatively connected to the system, and
   in runtime, i.e., during execution of the executable software product:
   d. detecting any addition, deletion or change of the dynamic procedure source code in the memory using the change detector;
   e. compiling a selection of the dynamic procedure source code, using the runtime compiler; and
   f. linking the compiled selection of the dynamic procedure source code, using the runtime linker;
   g. detecting the at least one trigger point comprised in the executable software product, by detecting a first programming interface in the source code of the software product, by the trigger point detector;
   h. in response to the detection of the at least one trigger point, for each of the at least one detected trigger point:
      i) mapping, by the trigger point detector, the detected first programming interface with one or more stored dynamic procedure in the memory having a second programming interface that matches the detected first programming interface and
      ii) invoking, from the memory, the at least one dynamic procedure associated with the detected trigger point; and
   i. loading, or executing, the at least one invoked dynamic procedure within the executing program, using the runtime loader.

12. The non-transitory computer-readable storage medium of claim 11, wherein the storage medium includes a non-volatile data carrier containing the executable program instructions.

* * * * *